(12) United States Patent
Suzuki

(10) Patent No.: US 7,823,615 B2
(45) Date of Patent: Nov. 2, 2010

(54) PNEUMATIC TIRE

(75) Inventor: Masumi Suzuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 429 days.

(21) Appl. No.: 11/636,523

(22) Filed: Dec. 11, 2006

(65) Prior Publication Data

US 2007/0137755 A1    Jun. 21, 2007

(30) Foreign Application Priority Data

Dec. 21, 2005    (JP) .............................. 2005-367459

(51) Int. Cl.
 B60C 9/00    (2006.01)
 B60C 9/18    (2006.01)
 B60C 9/22    (2006.01)
 B60C 9/28    (2006.01)

(52) U.S. Cl. ....................... 152/526; 152/531; 152/533; 152/535; 152/538

(58) Field of Classification Search ................. 152/526, 152/530, 531, 533, 534, 535, 536, 537, 538
 See application file for complete search history.

(56) References Cited

U.S. PATENT DOCUMENTS

| 2004/0211501 A1* | 10/2004 | Kajita | .................... 152/209.15 |
| 2005/0205189 A1 | 9/2005 | Yoshinaka | |

FOREIGN PATENT DOCUMENTS

| EP | 0 820 882 A2 | 1/1998 |
| JP | 7-215011 | * 8/1995 |
| JP | 2000-203212 A | 7/2000 |
| JP | 2000-233604 A | 8/2000 |
| JP | 2001-163005 A | 6/2001 |
| JP | 2001-180225 A | 7/2001 |
| JP | 2002-96609 A | 4/2002 |
| JP | 2002-307910 A | 10/2002 |
| JP | 10-2004-0060383 A | 7/2004 |
| JP | 2004-224277 A | 8/2004 |
| JP | 2005-263137 A | 9/2005 |

* cited by examiner

*Primary Examiner*—Justin Fischer
(74) *Attorney, Agent, or Firm*—Birch, Stewart, Kolasch & Birch, LLP

(57) ABSTRACT

A tire (2) includes a belt (12) provided on a carcass (10) and a band (14) for covering the belt (12). The band (14) includes a full band (36) and a pair of edge bands (38) provided in the vicinity of a shoulder and positioned on an outside in a radial direction of the full band (36). The full band (36) has a first band cord (40) wound spirally in a substantially circumferential direction. The edge band (38) has a second band cord (44) wound spirally in the substantially circumferential direction. A modulus of the second band cord (44) is higher than that of the first band cord (40). In the tire (2), it is preferable that an outer end (50) of the full band (36) should be provided on an outside of an outer end (48) of the belt (12) in an axial direction. An outer end (52) of the edge band (38) is identical to the outer end (48) of the belt (12) or is provided on an inside thereof.

2 Claims, 3 Drawing Sheets

PNEUMATIC TIRE

This application claims priority on Patent Application No. 2005-367459 filed in JAPAN on Dec. 21, 2005, the entire contents of which are hereby incorporated by reference.

BACKGROUND OF THE INVENTION

1. Field of the Invention

The present invention relates to a pneumatic tire which is to be mainly attached to a car.

2. Description of the Related Art

A radial tire for high speed straight running comprises a band between a tread and a belt. The band includes a band cord wound in a circumferential direction. The band cord restrains the belt. Lifting of the belt which is caused by a centrifugal force in the high speed straight running is controlled by the band cord. US2005/0205189 (JP-A No. 2005-263137) has disclosed a pneumatic tire which is excellent in a silence and a ride comfort. In the tire, the band includes a side portion positioned in the vicinity of an outer end of the belt and a center portion positioned on a center in an axial direction. The side portion includes a band cord having a high modulus. The center portion includes a band cord having a low modulus.

The band for covering a whole region of the belt fully restrains the vicinity of a center of the belt. On the other hand, in the band, the control of a restraining force in the vicinity of an outer end of the belt is not relatively sufficient. In the band, the control of the lifting in the vicinity of the outer end is not relatively sufficient. A road noise cannot be fully reduced by the relatively insufficient restraining force.

By using a cord having a high modulus for the band, the vicinity of the outer end of the belt can be sufficiently restrained. By the band, rigidity of the tire is excessively increased. The excessive rigidity hinders the ride comfort of the tire. The band causes a great outside noise. If the modulus of the cord is excessively high, a handling stability is also deteriorated.

When the outer end of the band and that of the belt overlap each other in an axial direction, a step is formed. In some cases in which a great step is formed, air remains in the tire at a vulcanizing step. In these cases, an air remaining defect is generated in the tire.

There are some tires using a band including a band cord having a high modulus. In the tire, an outside diameter of the band is not sufficiently enlarged at the vulcanizing step. For this reason, a nonuniform deformation is caused over a green tire in some cases. In the tire, a uniformity is deteriorated.

The band cord is wound spirally in a circumferential direction and is slightly inclined with respect to the circumferential direction. At the outer end of the band restraining the belt, therefore, the rigidity in the circumferential direction of the band is partially changed. In a tire in which the outer end of the band is provided on the outside in the axial direction of the outer end of the belt, the change of the rigidity hinders the uniformity of the tire in some cases. In a tire using a band cord having a high modulus in a band, particularly, the uniformity is remarkably hindered due to the change of the rigidity in the circumferential direction. In a tire having a poor uniformity, vibrations such as a shake and a roughness are generated. In such a tire, a silence and a ride comfort are poor.

It is an object of the present invention to provide a pneumatic tire which is excellent in a silence and a ride comfort.

SUMMARY OF THE INVENTION

A pneumatic tire according to the present invention comprises a tread having an external surface to form a tread surface, a pair of sidewalls extended almost inward in a radial direction from an end of the tread, a pair of beads extended almost inward in the radial direction of the sidewalls, a carcass laid between both of the beads along insides of the tread and the sidewalls, a belt provided on the carcass at an inside in the radial direction of the tread, and a band positioned between the belt and the tread and serving to cover the belt. The band includes a full band, and a pair of edge bands provided in the vicinity of a shoulder and positioned on an outside in the radial direction of the full band. The full band includes a first band cord wound spirally in a substantially circumferential direction. The edge band includes a second band cord wound spirally in the substantially circumferential direction. A modulus of the second band cord is higher than that of the first band cord.

In the tire, preferably, a position of an outer end of the full band is placed on an outside of an outer end of the belt in an axial direction.

In the tire, preferably, an axial distance between an outer end of the full band and that of the belt is equal to or greater than 1 mm and is equal to or smaller than 15 mm.

In the tire, preferably, a position of an outer end of the edge band is identical to that of an outer end of the belt or is placed on an inside thereof in an axial direction.

In the tire, preferably, an axial distance between an outer end of the edge band and that of the belt is equal to or greater than 1 mm.

In the tire, the vicinity of the outer end of the belt is fully restrained, and furthermore, a uniformity in the vicinity of the outer end of the belt is enhanced. The tire has a small road noise. In the tire, rigidity in the vicinity of a center in the axial direction is not excessively high. The tire is also excellent in a ride comfort.

DESCRIPTION OF THE PREFERRED EMBODIMENTS

The present invention will be described below in detail based on a preferred embodiment with reference to the drawings.

Figure 1:
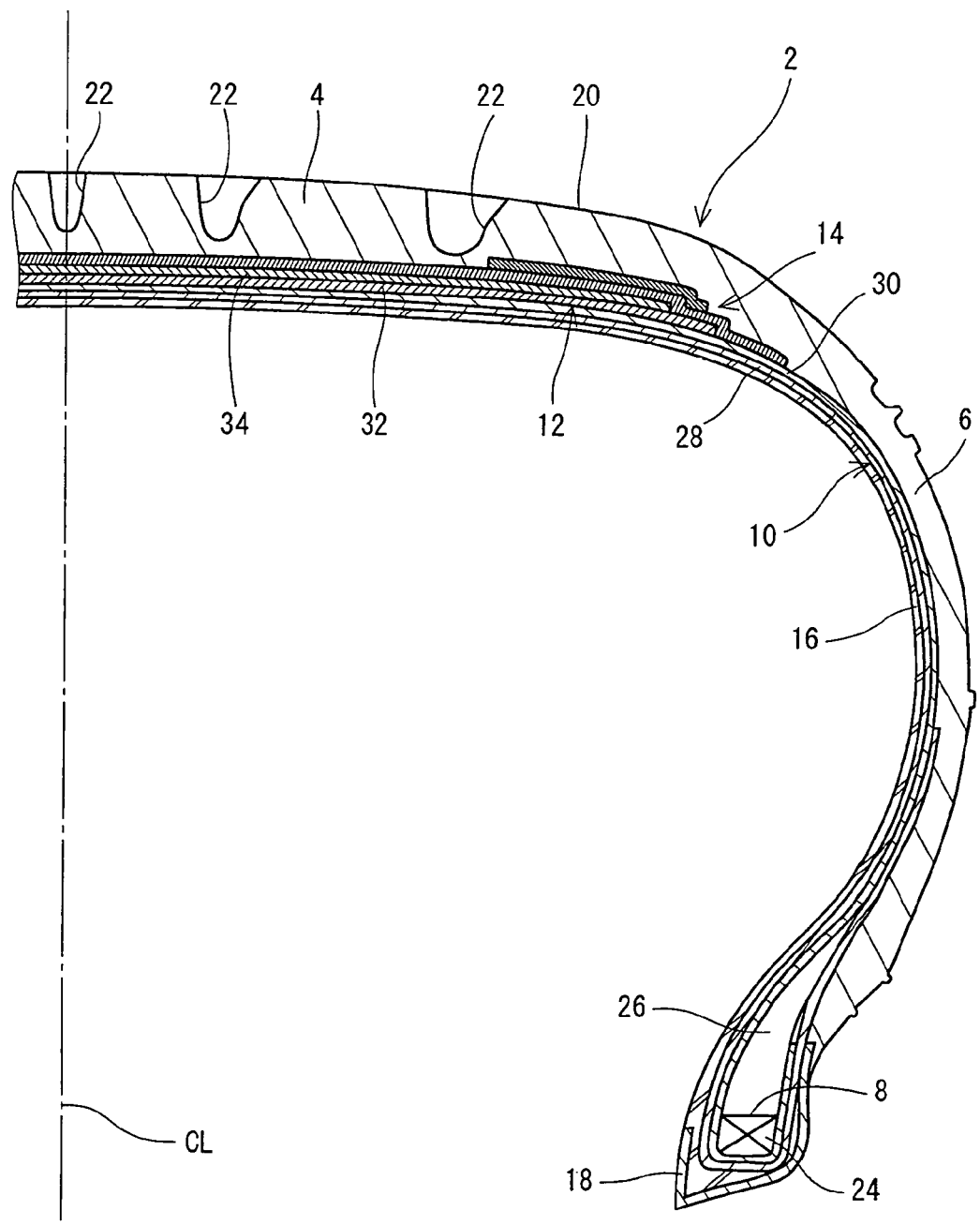
FIG. 1 is a sectional view showing a part of a pneumatic tire according to an embodiment of the present invention.

A tire 2 shown in FIG. 1 comprises a tread 4, a sidewall 6, a bead 8, a carcass 10, a belt 12, a band 14, an inner liner 16 and a chaffer 18. The tire 2 is a pneumatic tire of a tubeless type. In FIG. 1, a vertical direction is set to be a radial direction of the tire 2. A transverse direction is set to be an axial direction of the tire 2. A perpendicular direction to a paper is set to be a circumferential direction of the tire 2. The tire 2 takes an almost symmetrical shape about a one-dotted chain line CL in FIG. 1. The one-dotted chain line CL represents an equator plane of the tire 2.

The tread 4 is formed by a crosslinked rubber. The tread 4 takes a shape of an outward convex in the radial direction. The tread 4 forms a tread surface 20 to come in contact with a road surface. A groove 22 is provided on the tread surface 20. By the groove 22, a tread pattern is formed.

The sidewall 6 is extended almost inward in the radial direction from an end of the tread 4. The sidewall 6 is formed by a crosslinked rubber. The sidewall 6 absorbs a shock from the road surface. The sidewall 6 prevents an external damage of the carcass 10.

The bead 8 is extended almost inward in the radial direction from the sidewall 6. The bead 8 includes a core 24 and an apex 26 extended outward in the radial direction from the core 24. The core 24 is ring-shaped. The core 24 includes a plurality of non-extensible wires (typically wires formed of steel). The apex 26 is tapered outward in the radial direction. The apex 26 is formed by a crosslinked rubber having a high hardness.

The carcass 10 includes a first carcass ply 28 and a second carcass ply 30. The first carcass ply 28 and the second carcass ply 30 are laid between the beads 8 on both sides. The first carcass ply 28 and the second carcass ply 30 are provided along the inside of the tread 4 and the sidewall 6. The first carcass ply 28 and the second carcass ply 30 are folded back through the core 24 outward from the inside in the axial direction.

The first carcass ply 28 and the second carcass ply 30 are constituted by a carcass cord and a topping rubber, which is not shown. An absolute value of an angle formed by the carcass cord with respect to an equator plane is usually 75 to 90 degrees. In other words, the tire 2 is a radial tire. An organic fiber is usually used for the carcass cord. Examples of a preferable organic fiber include a polyester fiber, a nylon fiber, a rayon fiber, a polyethylene naphthalate fiber (PEN) and an aramid fiber.

The belt 12 is positioned on an outside in the radial direction of the carcass 10. The belt 12 is provided on the carcass 10. The belt 12 reinforces the carcass 10. The belt 12 includes an inner belt ply 32 and an outer belt ply 34. Each of the inner belt ply 32 and the outer belt ply 34 is formed by a belt cord and a topping rubber, which is not shown. The belt cord is inclined to the equator plane. A direction of the inclination of the belt cord of the inner belt ply 32 with respect to the equator plane is reverse to that of the inclination of the belt cord of the outer belt ply 34 with respect to the equator plane. A preferable material of the belt cord is steel. An organic fiber may be used for the belt cord.

The inner liner 16 is bonded to an inner peripheral surface of the carcass 10. The inner liner 16 is formed by a crosslinked rubber. A rubber having a small air permeability is used for the inner liner 16. The inner liner 16 plays a part in holding an internal pressure of the tire 2.

The chaffer 18 is positioned in the vicinity of the bead 8. When the tire 2 is incorporated in a rim, the chaffer 18 abuts on the rim. By the abutment, the vicinity of the bead 8 is protected. The chaffer 18 is usually constituted by a cloth and a rubber impregnated into the cloth. It is also possible to use the chaffer 18 formed by a single rubber.

Figure 2:
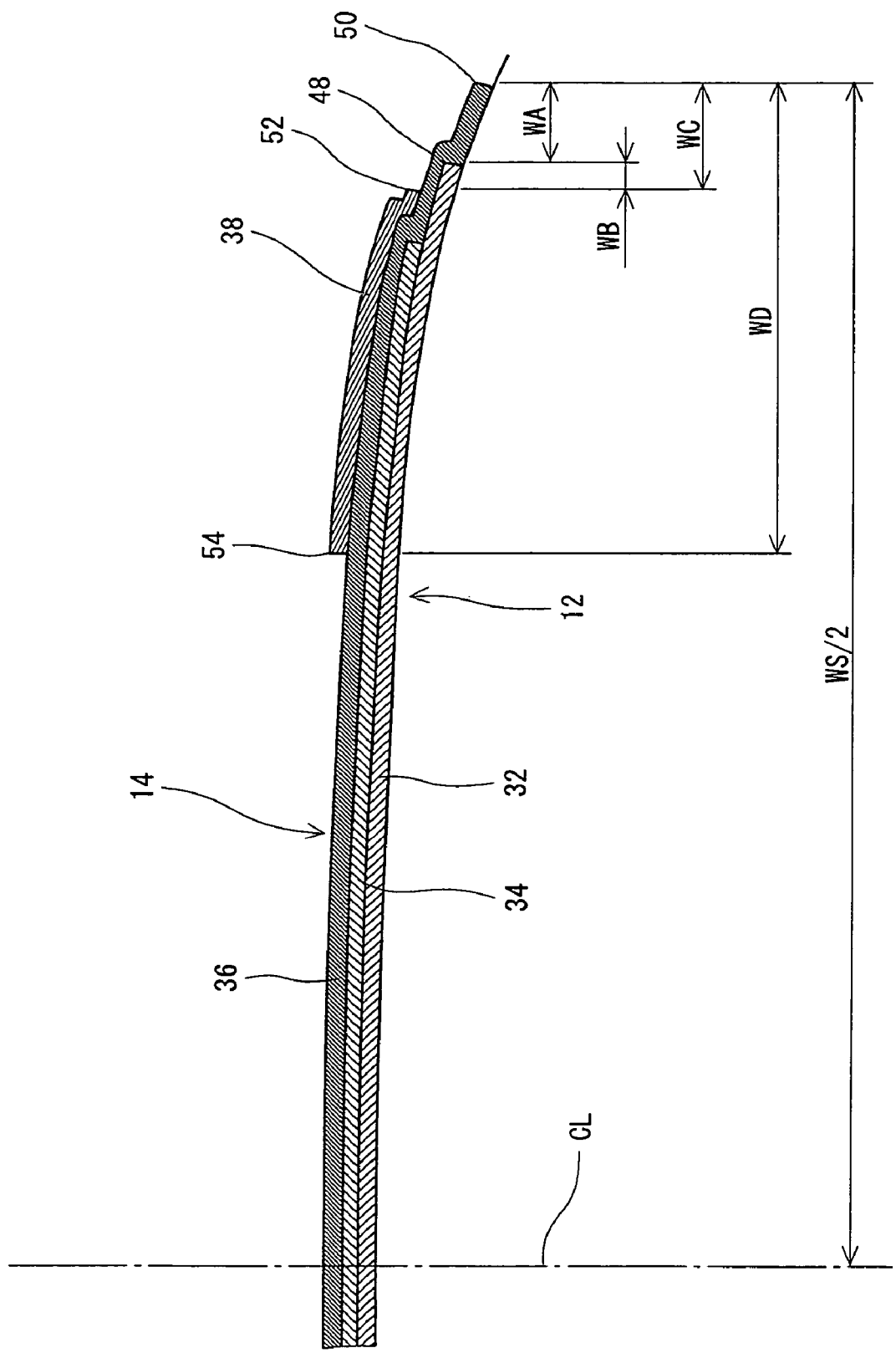
FIG. 2 is an enlarged sectional view showing a part of a belt and a band in the tire of FIG. 1.

FIG. 2 is an enlarged sectional view showing a part of the belt 12 and the band 14 in the tire 2 of FIG. 1. The band 14 is constituted by a full band 36 and a pair of edge bands 38 positioned in the vicinity of a shoulder. The edge band 38 is positioned on an outside in a radial direction of the full band 36.

Figure 3:
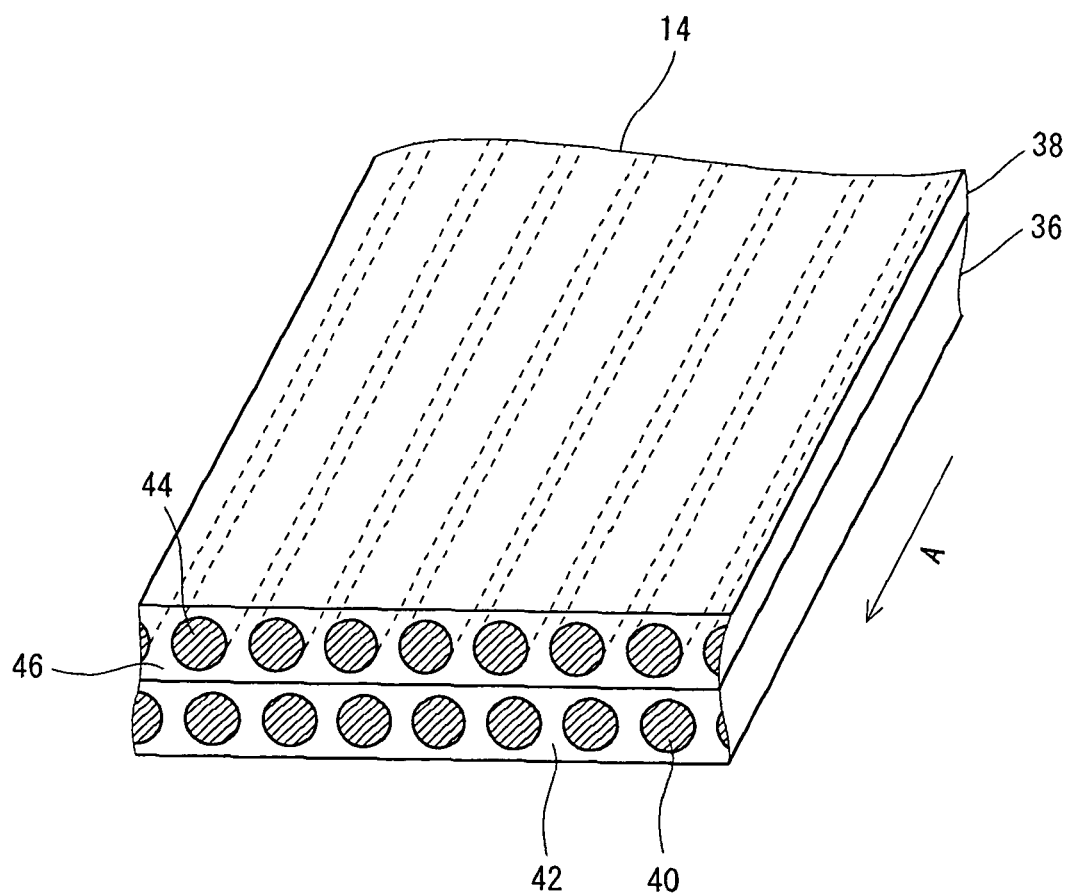
FIG. 3 is an enlarged exploded perspective view showing a full band and an edge band in FIG. 2.

FIG. 3 is an enlarged exploded perspective view showing the full band 36 and the edge band 38 in FIG. 2. In FIG. 3, an arrow line A represents the circumferential direction of the tire 2.

The full band 36 is constituted by a first band cord 40 and a topping rubber 42. The first band cord 40 is wound spirally. The first band cord 40 has a so-called jointless structure. The first band cord 40 is extended in a substantially circumferential direction. The first band cord 40 is wound spirally. For this reason, the first band cord 40 is strictly inclined slightly to the circumferential direction. An absolute value of an angle formed by the first band cord 40 and the circumferential direction is smaller than 2.0 degrees. In the present invention, a direction in which the absolute value of the angle with respect to the circumferential direction is smaller than 2.0 degrees is set to be the "substantially circumferential direction".

The first band cord 40 having a low modulus Mc is used for the full band 36. Accordingly, a retraining force of the full band 36 with respect to the vicinity of the center of the belt 12 is comparatively small. Rigidity in the vicinity of the center of the tire 2 comprising the full band 36 is comparatively small. The tire 2 is excellent in a ride comfort. The first band cord 40 having the low modulus Mc also contributes to a reduction in an outside noise and a decrease in a rolling resistance.

The edge band 38 is constituted by a second band cord 44 and a topping rubber 46. The second band cord 44 is wound spirally. The second band cord 44 has a so-called jointless structure. The second band cord 44 is also extended in the substantially circumferential direction in the same manner as the first band cord 40 of the full band 36.

The second band cord 44 having a high modulus Ms is used for the edge band 38. Accordingly, a restraining force of the edge band 38 for the vicinity of an outer end 48 of the belt 12 is great. By the great restraining force, a road noise is suppressed. In particular, a noise having a frequency in a middle region is suppressed. The tire 2 is excellent in a silence.

The outer end 48 of the belt 12 forms a boundary between a region in which the belt 12 is present and a region in which the belt 12 is not present. A step is generated in the outer end 48. The outer end 48 is a specific point. An outer end 50 of the full band 36 forms a boundary between a region in which the full band 36 is present and a region in which the full band 36 is not present. A step is generated in the outer end 50. The outer end 50 is a specific point. The outer end 50 is also a winding start portion or a winding end portion for the first band cord 40. In the start and end portions, the restraining force of the first band cord 40 against the carcass 10 is particularly great. An outer end 52 of the edge band 38 forms a boundary between a region in which the edge band 38 is present and a region in which the edge band 38 is not present. A step is generated in the outer end 52. The outer end 52 is a specific point. The outer end 52 is a winding start portion or a winding end portion for the second band cord 44. At the outer end 52, the second band cord 44 is folded back and is thus wound in some cases. In these cases, the restraining force is further increased. In the start and end portions, the restraining force of the second band cord 44 against the carcass 10 is particularly great.

In the tire 2, a position of the outer end 50 is placed on an outside of the outer end 48 in an axial direction. The full band 36 covers the whole belt 12. The full band 36 restrains the belt 12. The full band 36 controls the lifting of the belt 12.

In the tire 2, a position of the outer end 52 is placed on an inside of the outer end 48 in the axial direction. In other words, in the tire 2, the outer end 48, the outer end 50 and the outer end 52 are distributed in the axial direction. In the tire 2, a great step is not generated. Accordingly, the air remains with difficulty at a step of vulcanizing the tire 2. The outer end 52 may be disposed in the same position as the outer end 48 of the belt 12 in the axial direction. Also in this case, the stay of the air is suppressed. In the tire 2, the outer end 52 may be disposed between the outer end 48 and the outer end 50 in the axial direction.

At the step of vulcanizing the tire 2, a green tire is subjected to shaping. In the shaping, the green tire expands. At this time, the first band cord 40 and the second band cord 44 which are wound spirally do not expand considerably. If the position of the outer end 50 of the full band 36 is coincident with that of the outer end 52 of the edge band 38, the first band cord 40 or the second band cord 44 causes a nonuniform deformation on the carcass 10 due to a difference in a stretch. In the tire 2 according to the present invention, the outer end 50 and the outer end 52 are provided apart from each other. Therefore, it is possible to prevent the nonuniform deformation of the carcass 10. In the tire 2, the belt 12 and the full band 36 are present between the edge band 38 and the carcass 10. The belt 12 and the full band 36 impede the nonuniform deformation of the carcass 10 which is caused by the second band cord 44 having a high modulus.

As shown in FIG. 1, the edge band 38 is positioned on the inside in the axial direction of the outer end 48 of the belt 12. The full band 36 is positioned between the edge band 38 and the belt 12. The belt 12 is uniformly restrained by the full band 36. In the tire 2, a uniformity is enhanced. The tire 2 is excellent in a silence and a ride comfort.

In FIG. 2, a double arrow line WA indicates an axial distance between the outer end 50 of the full band 36 and the outer end 48 of the belt 12. A double arrow line WB indicates an axial distance between the outer end 48 of the belt 12 and the outer end 52 of the edge band 38. A double arrow line WC indicates an axial distance between the outer end 50 of the full band 36 and the outer end 52 of the edge band 38.

In the tire 2, it is preferable that the axial distance WA should be equal to or greater than 1 mm and be equal to or smaller than 15 mm. By setting the axial distance WA to be equal to or greater than 1 mm, it is possible to effectively suppress an air remaining defect and a damage of the carcass 10. The tire 2 is excellent in a durability. By setting the axial distance WA to be equal to or greater than 1 mm, furthermore, the full band 36 sufficiently restrains the belt 12 to control the lifting. From this viewpoint, the axial distance WA is more preferably equal to or greater than 3 mm and is particularly preferably equal to or greater than 5 mm. By setting the axial distance WA to be equal to or smaller than 15 mm, it is possible to properly maintain rigidity in the vicinity of a shoulder. The tire 2 is excellent in the ride comfort. From this viewpoint, the axial distance WA is more preferably equal to or smaller than 10 mm. The axial distance WA is measured outward in the axial direction with the outer end 48 of the belt 12 set to be a reference. The axial distance WA is represented by a length between the outer end 48 of the belt 12 and the outer end 50 of the full band 36 positioned on the outside in the axial direction of the outer end 48.

In the tire 2, it is preferable that the axial distance WB should be equal to or greater than 1 mm and be equal to or smaller than 10 mm. By setting the axial distance WB to be equal to or greater than 1 mm, it is possible to effectively suppress the air remaining defect and the nonuniform deformation of the carcass 10. The tire 2 is excellent in a durability. By setting the axial distance WB to be equal to or greater than 1 mm, furthermore, the edge band 38 uniformly restrains the full band 36 and the belt 12. Therefore, the tire 2 is excellent in a uniformity. The tire 2 is excellent in a silence and a ride comfort. From this viewpoint, it is more preferable that the axial distance WB should be equal to or greater than 3 mm. By setting the axial distance WB to be equal to or smaller than 10 mm, it is possible to properly maintain rigidity in the vicinity of the center in the axial direction of the tire 2. The tire 2 is excellent in the ride comfort. From this view point, it is more preferable that the axial distance WB should be equal to or smaller than 7 mm. The axial distance WB is measured inward in the axial direction with the outer end 48 of the belt 12 set to be a reference. The axial distance WB is represented by a length between the outer end 48 of the belt 12 and the outer end 52 of the edge band 38 positioned on the inside in the axial direction of the outer end 48.

In the tire 2, it is preferable that the axial distance WC should be equal to or greater than 1 mm. By setting the axial distance WC to be equal to or greater than 1 mm, it is possible to effectively suppress the air remaining defect and the damage of the carcass 10. The tire 2 is excellent in a durability. By setting the axial distance WC to be equal to or greater than 1 mm, furthermore, the edge band 38 uniformly restrains the full band 36. Therefore, the tire 2 is excellent in a uniformity. The tire 2 is excellent in a silence and a ride comfort. From this viewpoint, it is more preferable that the axial distance WC should be equal to or greater than 3 mm.

In respect of an enhancement in a ride comfort, a reduction in an outside noise and a decrease in a rolling resistance, the modulus Mc of the first band cord 40 of the full band 36 is preferably equal to or lower than 2500 $N/mm^2$ and is more preferably equal to or lower than 2200 $N/mm^2$. If the modulus Mc is excessively small, the durability of the tire 2 is insufficient. From this viewpoint, the modulus Mc is preferably equal to or higher than 1000 $N/mm^2$ and is more preferably equal to or higher than 1500 $N/mm^2$.

In respect of a reduction in a road noise, the modulus Ms of the second band cord 44 of the edge band 38 is preferably equal to or higher than 3000 $N/mm^2$ and is more preferably equal to or higher than 5000 $N/mm^2$. If the modulus Ms is excessively high, a handling stability is impeded, and furthermore, the rolling resistance is increased. From this viewpoint, the modulus Ms is preferably equal to or lower than 15000 $N/mm^2$, is more preferably equal to or lower than 13000 $N/mm^2$, and is particularly preferably equal to or lower than 10000 $N/mm^2$.

In respect of a consistency of the ride comfort obtained by the full band 36 and the silence obtained by the edge band 38, it is preferable that a difference between the moduli Ms and Mc should be equal to or greater than 1000 $N/mm^2$ and be equal to or smaller than 12000 $N/mm^2$. The difference is more preferably equal to or greater than 3000 $N/mm^2$ and is particularly preferably equal to or greater than 5000 $N/mm^2$. The difference is more preferably equal to or smaller than 11000 $N/mm^2$ and is particularly preferably equal to or smaller than 10000 $N/mm^2$.

In the present invention, a modulus of the first band cord 40 in an elongation rate of 2% is represented by the modulus Mc. A modulus of the second band cord 44 in an elongation rate of 2% is represented by the modulus Ms. The moduli Mc and Ms are measured in accordance with regulations of "JIS L 1017".

An organic fiber can be suitably used for the first band cord 40. Typically, a nylon fiber is used for the first band cord 40. It is also possible to use a polyester fiber or a vinylon fiber for the first band cord 40.

It is preferable that a density of the first band cord 40 in the full band 36 should be equal to or higher than 5 ends/cm and be equal to or lower than 20 ends/cm. It is preferable that a sectional area of the first band cord 40 in the full band 36 should be equal to or greater than 0.10 $mm^2$ and be equal to or smaller than 1.6 $mm^2$.

An organic fiber can be suitably used for the second band cord 44. A preferable material of the second band cord 44 includes a polyethylene naphthalate (PEN) fiber and an aramid fiber. A complex of the nylon fiber and the aramid fiber may be used for the second band cord 44. The complex contributes to a reduction in a road noise, an enhancement in a handling stability and a decrease in a rolling resistance. A ratio of weights of the nylon fiber and the aramid fiber in the complex is preferably equal to or higher than 1/4 and is more preferably equal to or higher than 2/3. The ratio of the weights is preferably equal to or lower than 4/1 and is more preferably equal to or lower than 3/2.

It is preferable that a density of the second band cord 44 in the edge band 38 should be equal to or higher than 5 ends/cm and be equal to or lower than 20 ends/cm. It is preferable that a sectional area of the second band cord 44 in the edge band 38 should be equal to or greater than 0.10 $mm^2$ and be equal to or smaller than 1.6 $mm^2$.

In FIG. 2, a double arrow line WS/2 is a half of a width of the full band 36. A double arrow line WD is an axial distance between the outer end 50 of the full band 36 and an inner end 54 of the edge band 38. It is preferable that a ratio of the axial distance WD to a width WS of the full band 36 should be equal to or higher than 5.0% and be equal to or lower than 20.0%. In some cases in which the ratio is lower than the range, the road noise is not sufficiently suppressed. From this viewpoint, the ratio is more preferably equal to or higher than 12% and is particularly preferably equal to or higher than 15%. In some cases in which the ratio exceeds the range, the ride comfort becomes insufficient, the rolling resistance is increased, and furthermore, the outside noise is increased. From this viewpoint, the ratio is more preferably equal to or lower than 19% and is particularly preferably equal to or lower than 18%.

The dimension and the angle of the tire 2 are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure. For convenience, the internal pressure of the tire 2 for a car is set to be 180 kPa.

EXAMPLES

Example 1

A pneumatic tire for a car having the structure shown in FIGS. 1 to 3 was obtained. The details of a band of the tire are shown in the following Table 1. In the tire, an angle formed by a belt cord of an inner belt ply with respect to an equator plane is +24 degrees and an angle formed by a belt cord of an outer belt ply with respect to the equator plane is −24 degrees. The tire has a size of "205/50R17". An axial distance WA between an outer end of a full band and that of a belt is 5 mm. An axial distance WB between the outer end of the belt and that of an edge band is 3 mm. An axial distance WC between the outer end of the full band and that of the belt is 8 mm. A ratio (WD/WS×100) of an axial distance WD between the outer end of the full band and an inner end of the edge band to a width WS of the full band is 17.6%.

Examples 6 to 9

A tire was obtained in the same manner as in the example 1 except that the axial distance WA was set as shown in the following Table 1.

Examples 10 and 11

A tire was obtained in the same manner as in the example 1 except that the axial distance WB was set as shown in the following Table 1.

Example 5

A tire was obtained in the same manner as in the example 1 except that the axial distances WA and WB were set as shown in the following Table 1.

Example 12

A tire was obtained in the same manner as in the example 1 except that the axial distance WA was set as shown in the following Table 1 and the outer end of the edge band was disposed in the same position as the outer end of the full band in the axial direction. In the tire, the axial distance WC between the outer end of the full band and that of the belt is 0 mm.

Examples 2 to 4

A tire was obtained in the same manner as in the example 1 except that the ratio (WD/WS×100) was set as shown in the following Table 1.

Examples 13 to 18

A tire was obtained in the same manner as in the example 1 except that a material of a second band cord was set as shown in the following Table 1. The second band cord used in each of the tires according to the examples 14 to 18 is constituted by a complex of a nylon fiber and an aramid fiber.

Comparative Examples 1 and 2

A tire was obtained in the same manner as in the example 1 except that materials of first and second band cords were set as shown in the following Table 1.

Comparative Example 3

A tire was obtained in the same manner as in the example 1 except that the material of the first band cord, the material of the second band cord, the axial distance WA, the axial distance WB, the axial distance WC and the ratio (WD/WS×100) were set as shown in the following Table 1.

[Measurement of Noise]

A tire was incorporated into a rim of "17×6.5-JJ" and an internal pressure of the tire was set to be 230 kPa. The tire was attached to a car of a front engine front wheel drive type which has an engine displacement of 2300 $cm^3$. The car was caused to run at a speed of 50 km/h over an asphalted road having a high roughness. A volume (an overall value) in a right ear of a driver and a volume on an outside of the car in the driving were measured. Based on the comparative example 2, an evaluation was carried out. Referring to the examples 1 to 18 and the comparative examples 1 and 3, a value obtained by decreasing a volume in the comparative example 2 from each of volumes was calculated. The result is shown in the following Tables 1 and 2.

[Evaluation of Uniformity of Tire]

20 tires having the specifications described above were manufactured for trial and their uniformities were measured. The uniformities were evaluated by a drum testing machine. A radial force variation (RFV), a lateral force variation (LFV) and a conicity (CON) were measured in accordance with uniformity test conditions of JASO C607:2000. An evaluation speed was set to be 10 km/h. A result is expressed in an average value of data obtained from the 20 tires. It is indicated that a smaller numerical value is better. The result is shown in the following Tables 1 and 2.

TABLE 1

Specification of Tire and Result of Evaluation.

| | | Comp. Example 1 | Comp. Example 2 | Example 2 | Example 3 | Example 4 | Example 5 | Example 6 | Example 7 | Example 1 | Example 8 | Example 9 |
|---|---|---|---|---|---|---|---|---|---|---|---|---|
| First band cord | Material | PEN | Nylon | Nylon | Nylon | Nylon | Nylon | Nylon | Nylon | Nylon | Nylon | Nylon |
| | Modulus Mc [N/mm$^2$] | 12590 | 1950 | 1950 | 1950 | 1950 | 1950 | 1950 | 1950 | 1950 | 1950 | 1950 |
| Second band cord | Material | Nylon | Nylon | PEN | PEN | PEN | PEN | PEN | PEN | PEN | PEN | PEN |
| | Modulus Ms [N/mm$^2$] | 1950 | 1950 | 12590 | 12590 | 12590 | 12590 | 12590 | 12590 | 12590 | 12590 | 12590 |
| | WA [mm] | 5 | 5 | 5 | 5 | 5 | 1 | 1 | 3 | 5 | 10 | 15 |
| | WB [mm] | 3 | 3 | 3 | 3 | 3 | 1 | 3 | 3 | 3 | 3 | 3 |
| | WC [mm] | 8 | 8 | 8 | 8 | 8 | 2 | 4 | 6 | 8 | 13 | 18 |
| | WD/WS × 100 [%] | 17.6 | 17.6 | 5.9 | 11.8 | 14.7 | 17.6 | 17.6 | 17.6 | 17.6 | 17.6 | 17.6 |
| | Road noise [db(A)] | −0.5 | ±0 | −0.5 | −0.9 | −1.2 | −0.6 | −1.2 | −1.4 | −1.5 | −1.4 | −1.4 |
| | Outside noise [db(A)] | +0.9 | ±0 | −0.1 | −0.3 | −0.3 | −0.1 | −0.4 | −0.6 | −0.5 | −0.6 | −0.6 |
| RFV | Average value [N] | 57.9 | 59.5 | 60.9 | 59.3 | 59.0 | 60.3 | 59.8 | 59.5 | 58.9 | 58.5 | 60.1 |
| LFV | Average value [N] | 37.0 | 37.2 | 36.8 | 36.5 | 36.9 | 37.6 | 37.0 | 36.6 | 36.1 | 36.3 | 36.7 |
| CON | Average value [N] | +12.5 | −6.0 | −3.0 | −2.9 | −3.9 | −2.0 | −2.9 | −2.8 | −5.0 | −5.5 | −7.0 |

TABLE 2

Specification of Tire and Result of Evaluation.

| | | Example 10 | Example 11 | Example 12 | Example 13 | Example 14 | Example 15 | Example 16 | Example 17 | Example 18 | Comp. Example 3 |
|---|---|---|---|---|---|---|---|---|---|---|---|
| First band cord | Material | Nylon | Nylon | Nylon | Nylon | Nylon | Nylon | Nylon | Nylon | Nylon | Nylon |
| | Modulus Mc [N/mm$^2$] | 1950 | 1950 | 1950 | 1950 | 1950 | 1950 | 1950 | 1950 | 1950 | 1950 |
| Second band cord | Material | PEN | PEN | PEN | Nylon | Complex | Complex | Complex | Complex | Complex | Nylon |
| | Modulus Ms [N/mm$^2$] | 12590 | 12590 | 12590 | 3230 | 5400 | 6900 | 7600 | 8200 | 9000 | 1950 |
| | WA [mm] | 5 | 5 | 5 | 5 | 5 | 5 | 5 | 5 | 5 | 0 |
| | WB [mm] | 5 | 10 | — | 3 | 3 | 3 | 3 | 3 | 3 | 0 |
| | WC [mm] | 10 | 15 | 0 | 8 | 8 | 8 | 8 | 8 | 8 | 0 |
| | WD/WS × 100 [%] | 17.6 | 17.6 | 17.6 | 17.6 | 17.6 | 17.6 | 17.6 | 17.6 | 17.6 | 17.6 |
| | Road noise [db(A)] | −1.7 | −1.7 | −1.8 | −0.3 | −0.5 | −0.5 | −0.7 | −0.8 | −1.0 | +0.5 |
| | Outside noise [db(A)] | −0.6 | −0.5 | −0.2 | −0.3 | −0.5 | −0.8 | −0.8 | −0.9 | −1.0 | +0.3 |
| RFV | Average value [N] | 57.2 | 58.2 | 67.8 | 59.7 | 59.4 | 59.4 | 59.0 | 58.8 | 58.9 | 72.3 |
| LFV | Average value [N] | 35.3 | 35.5 | 42.7 | 36.6 | 36.7 | 36.4 | 36.3 | 36.1 | 36.2 | 49.3 |
| CON | Average value [N] | −4.1 | −4.3 | −12.0 | −6.0 | −6.1 | −6.0 | −5.7 | −5.5 | −5.4 | −15.0 |

As shown in the Tables 1 and 2, the tire according to each of the examples is excellent in a silence and a ride comfort. From the result of the evaluation, the advantages of the present invention are apparent.

The above description is only illustrative and various changes can be made without departing from the scope of the present invention.

What is claimed is:

1. A pneumatic tire comprising a tread having an external surface to form a tread surface, a pair of sidewalls extended almost inward in a radial direction from an end of the tread, a pair of beads extended almost inward in the radial direction of the sidewalls, a carcass laid between both of the beads inside of the tread and the sidewalls, a belt provided inside the carcass in the radial direction of the tread, and a band positioned between the belt and the tread and serving to cover the belt, wherein the band includes a full band and a pair of edge bands provided in the vicinity of a shoulder and positioned outside in the radial direction of the full band, an outer end of the full band is positioned outside of an outer end of the edge band in the axial direction, the outer end of the full band is positioned outside of an outer end of the belt in the axial direction, the full band includes a first band cord wound spirally in a substantially circumferential direction, the edge band includes a second band cord wound spirally in the substantially circumferential direction, a modulus of the second band cord is higher than that of the first band cord, an outer end of the edge band is positioned inside of an outer end of the belt in an axial direction, the axial distance between the outer end of the edge band and that of the belt is equal to or greater than 3 mm, the axial distance between the outer end of the full band and that of the belt is equal to or greater than 3 mm and is equal to or smaller than 10 mm, and the ratio of the axial distance between the inner end of the edge band and that of the full band to the axial width of the full band is equal to or greater than 11.8%.

2. The tire according to claim 1, wherein an axial distance between the outer end of the edge band and that of the full band is equal to or greater than 4 mm.

* * * * *